(No Model.) 4 Sheets—Sheet 1.
L. DE L. WELLS.
SIGNALING APPARATUS.

No. 537,738. Patented Apr. 16, 1895.

Witnesses.
W. Cross
J. H. Bingham

Inventor
Arnold de Lanton Wells (No Model.)

L. DE L. WELLS.
SIGNALING APPARATUS.

No. 537,738.

4 Sheets—Sheet 2.

Patented Apr. 16, 1895.

Witnesses
William Cross

Inventor
Lionel de Lantour Wells (No Model.) 4 Sheets—Sheet 3.
L. DE L. WELLS.
SIGNALING APPARATUS.
No. 537,738. Patented Apr. 16, 1895.
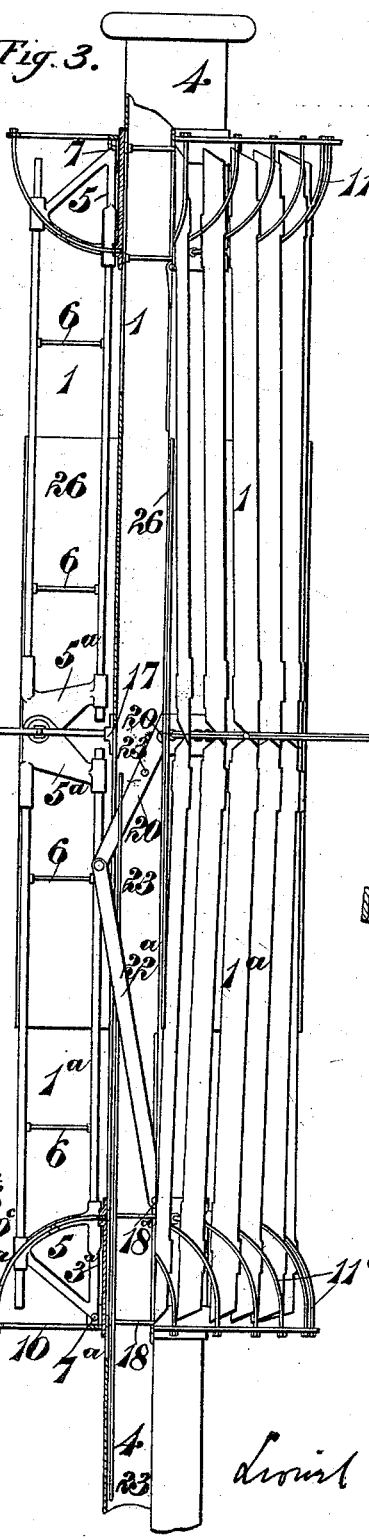
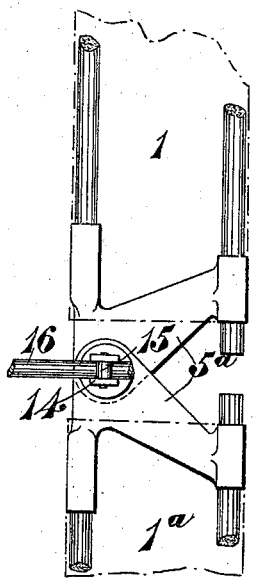
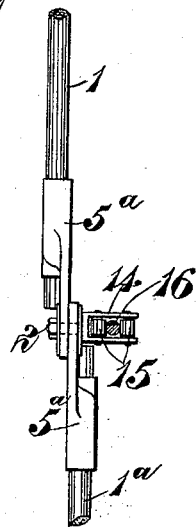
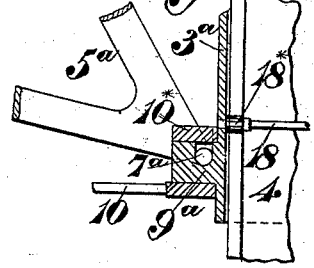
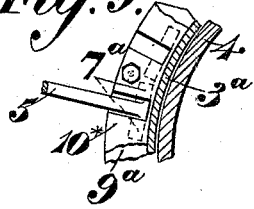
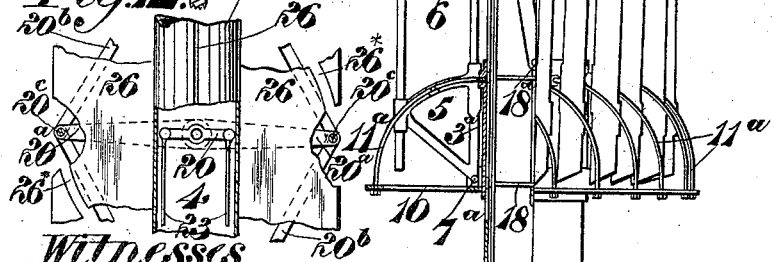
Witnesses
William Cross
H. Bingham
Inventor
Lionel de Lautour Wells (No Model.)  4 Sheets—Sheet 4.

L. DE L. WELLS.
SIGNALING APPARATUS.

No. 537,738.  Patented Apr. 16, 1895.

Witnesses
William Cross

Inventor
Lionel de Lauton Wells.

UNITED STATES PATENT OFFICE.

LIONEL DE LAUTOUR WELLS, OF LONDON, ENGLAND.

SIGNALING APPARATUS.

SPECIFICATION forming part of Letters Patent No. 537,738, dated April 16, 1895.

Application filed December 13, 1893. Serial No. 493,597. (No model.) Patented in England May 2, 1893, No. 8,833; in France November 2, 1893, No. 33,804, and in Italy December 31, 1893, LXIX, 54.

*To all whom it may concern:*

Be it known that I, LIONEL DE LAUTOUR WELLS, a subject of the Queen of Great Britain and Ireland, residing at Piccadilly, in the city of London, England, have invented Improvements in Signaling Apparatus for Naval and other Purposes, (for which patents have been granted in Great Britain and Ireland, dated May 2, 1893, No. 8,833; in France, dated November 2, 1893, No. 33,804, and in Italy, dated December 31, 1893, Vol. LXIX, No. 54,) of which the following is a specification.

This invention has reference to an improved construction of signaling apparatus which comprises a skeleton or frame capable of being quickly expanded or opened, and collapsed or shut, as hereinafter more particularly explained.

This improved signaling apparatus is suitable for naval and military purposes and is capable of being readily used for short or long ranges in all weathers and with any ordinary code, for example the Morse code. The construction is such that the apparatus does not offer serious resistance to the wind, and yet, unlike the semaphores heretofore usually employed, can be readily seen from all points.

Figure 1:
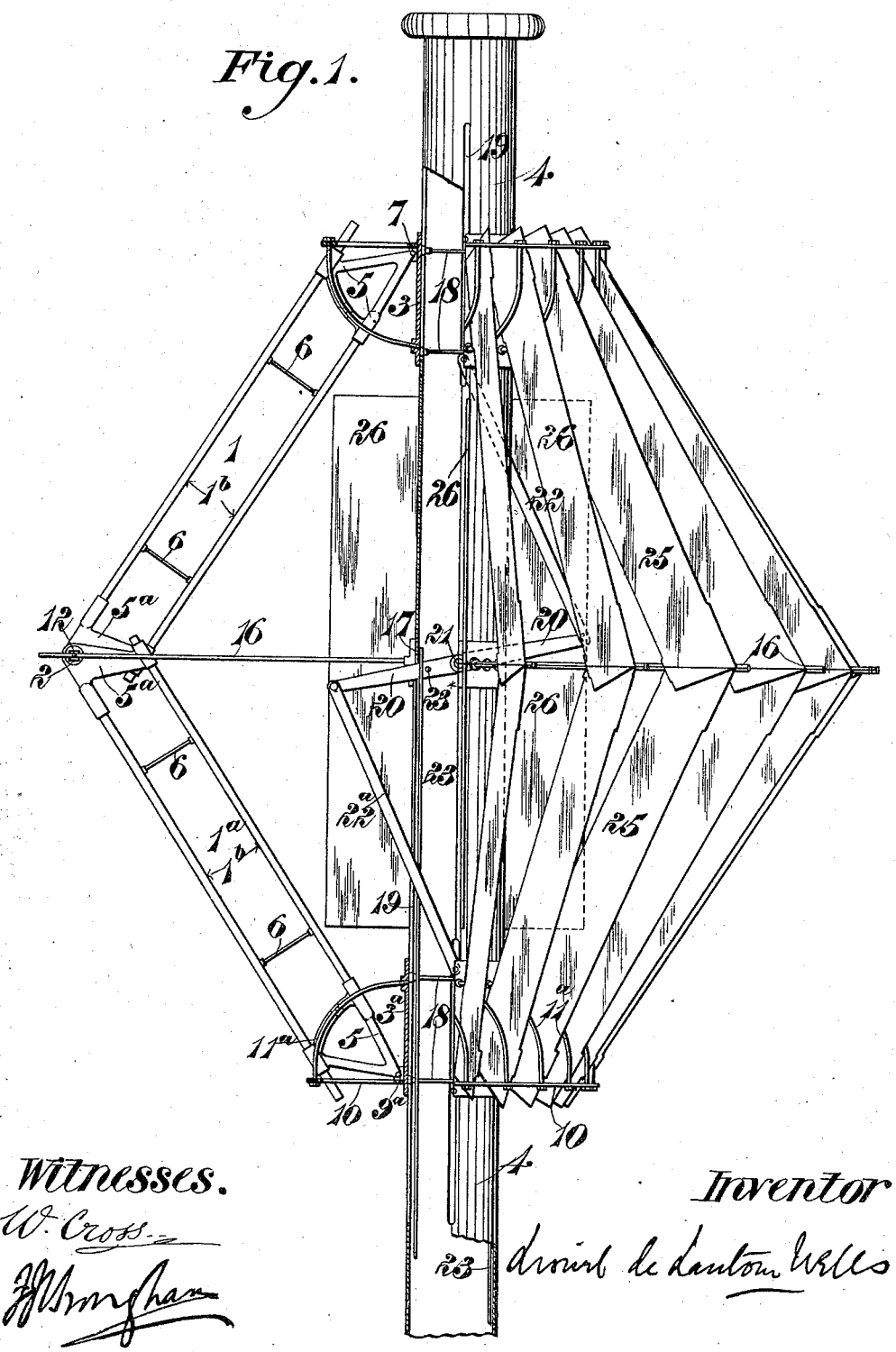
Figure 2:
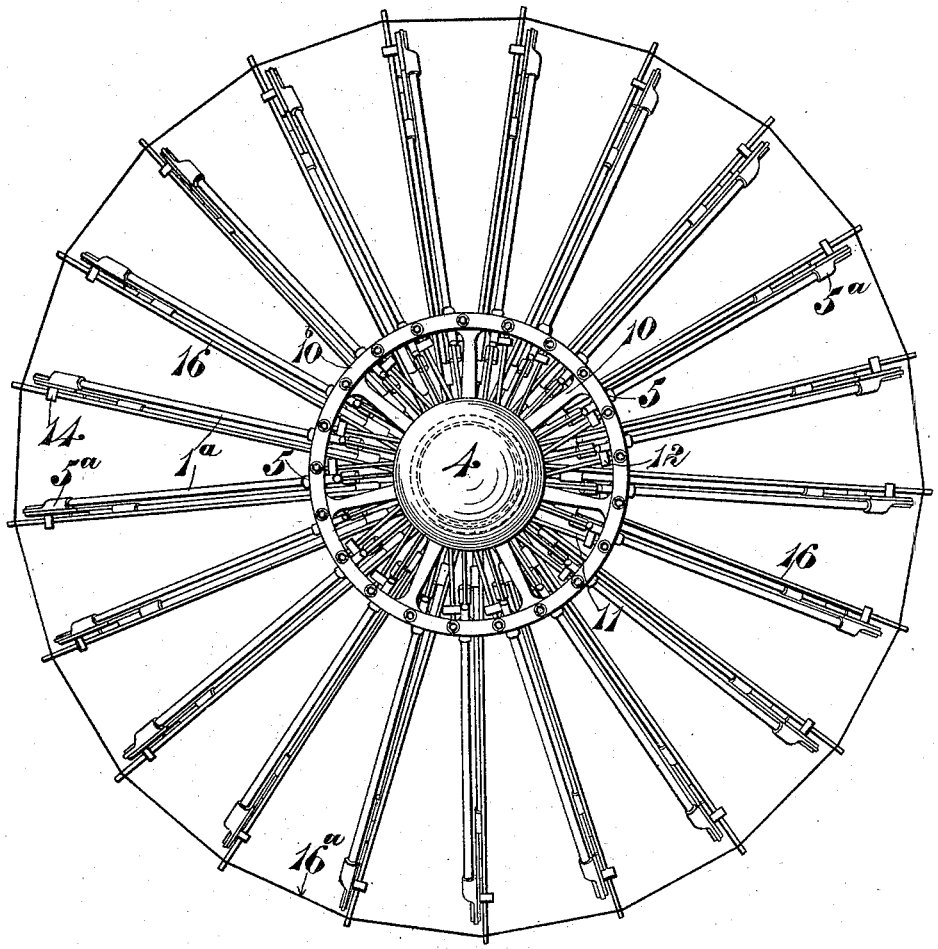
Figure 10:
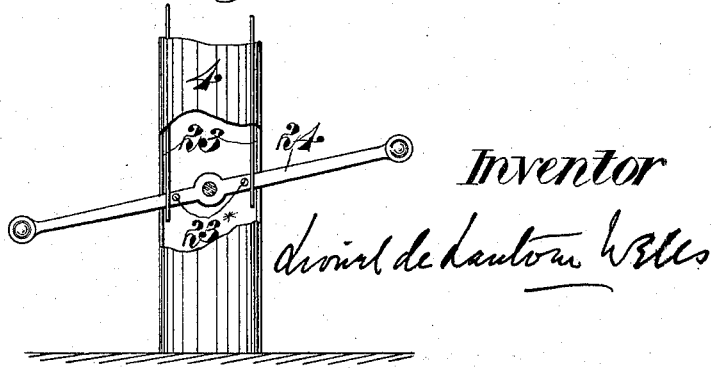
Figure 4:
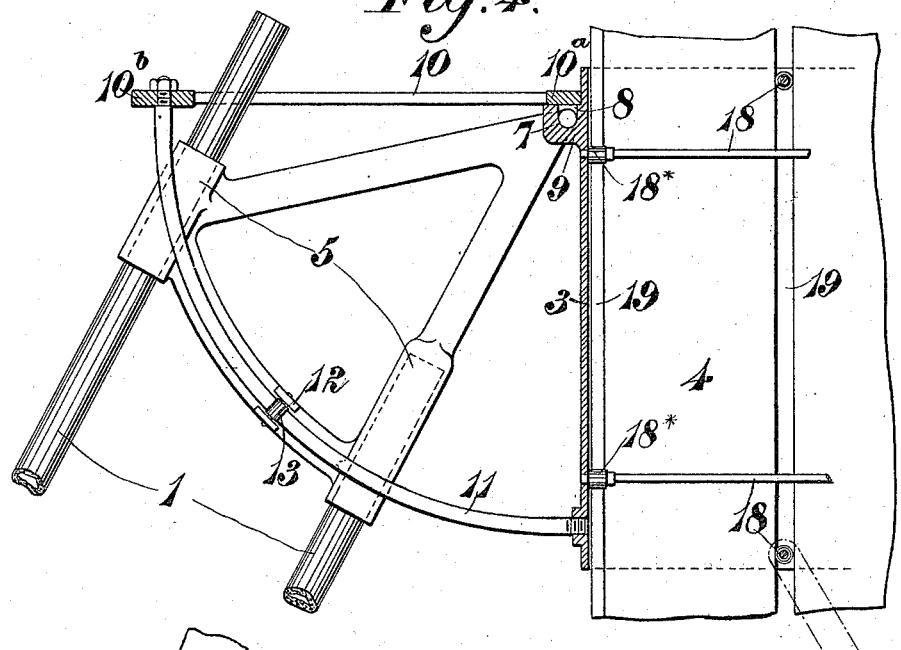
Figure 5:
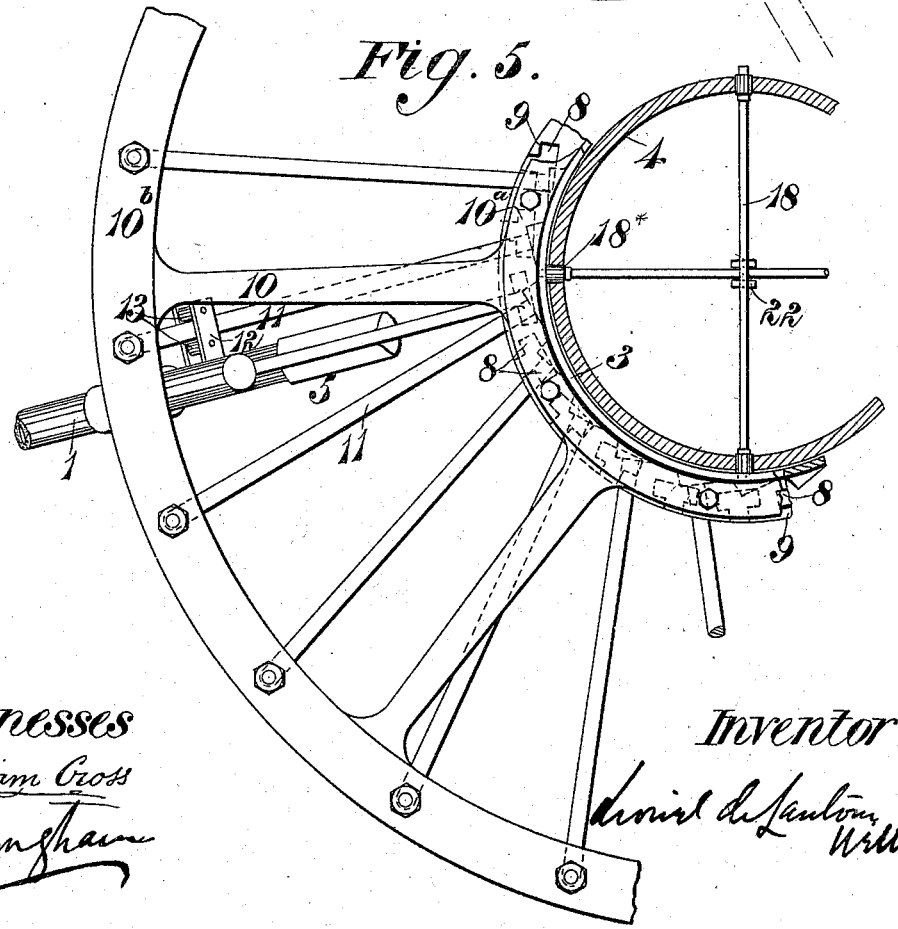

Figure 1 of the accompanying drawings shows this improved signaling apparatus (expanded) partly in central vertical section, and partly in side elevation. Fig. 2 is a plan. Fig. 3 is a similar view to Fig. 1, but shows the apparatus collapsed. Figs. 4 and 5 show, in sectional elevation and sectional plan respectively, parts of the upper portion of the apparatus. Figs. 6 and 7 are elevations at right angles to each other, showing the manner of jointing and guiding parts of the apparatus. Figs. 8 and 9 show, respectively in plan and vertical section, the manner of jointing the lower portions of the apparatus together. Fig. 10 shows in elevation the lower part of a hollow mast or post with part of the operating appliance whereby the skeleton or frame mounted at or near the upper end of the mast or post can be expanded and collapsed. Figs. 11 and 12 are sectional detail views, showing a modified construction. Figs. 4 to 9 inclusive and Fig. 11 are drawn to a larger scale than the remaining figures.

Referring to Figs. 1 to 10 inclusive, the skeleton or frame in this case is constructed of a series of pairs of jointed rods 1, $1^a$, so arranged that when the said skeleton or frame is expanded, it will assume the form of two pyramids. These pairs of rods are jointed together at 2, and to rings or tubes 3, $3^a$ arranged to slide on a post 4, which, in the example shown, is the upper portion of the hollow mast of a ship. The rods 1, $1^a$ may be of any suitable material, such as bamboo or wood, or light metal tubing. They are secured at their ends in metal holders 5 $5^a$ and are stiffened by struts 6. Each of the upper holders 5 is provided at opposite sides with pivot pins 7 arranged to fit in bearings 8 in a radially slotted flange 9 on the said ring or tube. The pins are retained in place by the inner annular part $10^a$ of a spider frame 10, the outer annular portion $10^b$ of which is connected to the lower portion of the said ring or tube by rods 11. Each of these rods is bent to the arc of a circle having the axis of the corresponding pivot pins 7 as a center, and serves as a guide for the corresponding holder 5, which is fitted with a bracket 12, carrying a pair of anti-friction rollers 13 arranged to roll at opposite sides of the said rod. Each of the lower holders $5^a$ may be pivoted in a similar manner to the lower ring or tube $3^a$ and be guided by a circular guide rod $11^a$ the pivot pins $7^a$ being retained in their bearings in the slotted flange $9^a$ by a slotted annular cover plate $10^*$ (Figs. 8 and 9) that is fixed to the said flange and is independent of the spider frame 10. The holders $5^a$ on the adjacent ends of the rods constituting a pair of rods 1, $1^a$ are jointed together by a pin 2, carrying a bracket 14, in which are carried the axes of a pair of anti-friction rollers 15, arranged to roll at opposite sides of a fixed guide rod 16, of which there is one for each pair of rods 1, $1^a$. The inner ends of the several rods 16 are secured to a ring 17, fixed on the mast 4, and their outer ends are connected together by a metal wire or rod $16^a$, (Fig. 2.)

Each ring or tube 3, $3^a$ may be guided vertically by providing it internally with two pairs of cross rods 18, the rods of each pair being placed at right angles to each other and arranged to work in corresponding vertical slots 19 formed in the mast. To reduce friction, the ends of the said rods may be fitted with anti-friction rollers 18* arranged to roll against the sides of the said slots.

Various means may be used for quickly moving the rings or tubes 3, 3ª toward and from each other for opening and closing the apparatus. In the example shown the rings or tubes 3, 3ª are connected by rods 22, 22ª to a lever 20 mounted on a pin 21 and connected by suitable rods 23, or it may be by cords, to a second lever 24 (Fig. 10) fulcrumed in the hollow mast at any suitable part thereof, but preferably below an armored deck, so that the person or persons working the apparatus will be in a sheltered position.

The rods 22, 22ª may advantageously be connected to the said rings or tubes through one of the cross rods 18 of each ring or tube, as shown. The jointed end portions of the said rods 22, 22ª and lever 20 work through a pair of the lower slots 19 in the hollow mast. The ends of the rods 23, when these are used, may be slotted to receive the ends of the levers 20 and 24 as shown, pins 23* on these levers serving to keep the said rods in proper working position.

To render the apparatus practically opaque when expanded, so that it shall be easily distinguishable at a distance but so as nevertheless to permit of wind passing freely therethrough the spaces 1ᵇ between the rods 1 and between the rods 1ª may be provided with suitable flexible material such for example as canvas, as shown in full lines at the right hand side of Fig. 1, and in dotted lines in Fig. 6. This material may be white or black, or of any desired color; also there may (with advantage) be secured to the mast say four wings or plates 26 that will serve to render the central portion of the apparatus seemingly opaque from a distance. By constructing and connecting parts in the manner described to form a collapsible skeleton or frame, the upper and lower jointed portions thereof are made to practically balance each other, so that the skeleton or frame can be easily expanded and collapsed in accordance with the code of signals to be used, and as only a comparatively small movement of the lever 24 is necessary for this purpose, the change of form of the apparatus can be effected with great rapidity.

The apparatus can be constructed in various sizes according to circumstances. For a battle-ship, it may conveniently have a diameter of about nine feet at its central and widest part when expanded.

As will be obvious signaling apparatus according to this invention, can be constructed in various forms. Thus the flexible covering material may be dispensed with, provided the apparatus be otherwise so constructed that it can be easily distinguished when viewed from a distance while nevertheless allowing for the passage of wind. This can be done by substituting thin bars or blades of metal for the rods 1, 1ª and their filling material, such bars or rods resembling in form that of the built up portions of the skeleton or frame represented to the right in Fig. 1; also, instead of connecting both the upper and lower portions of the skeleton or frame to vertically movable rings or tubes, one only of such portions may be jointed to such a ring or tube, the other portion being jointed to a fixed ring, but in this case, the two parts of the apparatus would not balance each other, and consequently they could not be worked in so easy and rapid a manner as the apparatus described with reference to Figs. 1 to 10. The rods 1, 1ª might be curved to the form of an arc of a circle, so that the apparatus, when expanded, would present the appearance of a sphere, or approximately so, when seen from a distance, instead of that of two truncated cones placed base to base, as with the arrangement shown; also, instead of using pairs of jointed rods, as described, a number of flexible laths or strips of suitable material such as steel, cane or wood may be used, these being jointed at their upper and lower ends to rings or tubes, one or both of which is or are arranged to slide vertically upon the mast or post, and the arrangement being such that when the rings or tubes are moved together, or one toward the other, the laths or strips will be caused to bend and bulge outward so that if a sufficient number of them be used in the construction of the apparatus, it will be caused to assume an approximately spherical or ellipsoidal shape such as will be readily visible at a distance without offering serious resistance to the wind; and when the ring or tube or rings or tubes is or are moved in the opposite direction, the skeleton or frame, will be caused to collapse. This arrangement is more particularly suitable for apparatus of comparatively small size. Furthermore the rings or tubes 3, 3ª instead of being guided in their vertical movements by cross rods 18, 18ª working in slots 19 in the mast, may be provided with one or more pairs of guide rollers 3ᵇ as shown in Fig. 11, each arranged to work against opposite sides of a vertical guide bar 3ᶜ fixed to the exterior of the mast 4, thereby obviating the necessity of slotting the mast as in the previous arrangement. In this case the rings or tubes may be moved toward and from each other by pairs of levers 20ª and rods 20ᵇ that are external to the mast, as shown in Fig. 12, these levers and rods being worked from an internal lever 20 that is fixed to a spindle extending through the mast and carrying pairs of external levers 20ª, and is worked by rods 23 and lever 24 as before. In this case the wings or plates 26 constituting the pair that is in the same plane as the spindle, are cut away at points opposite to the ends of the spindle, to admit the external levers 20ᵃ and fastening nuts; and the wings constituting the pair of wings or plates that is at right angles to the first mentioned pair are slotted, as shown at 26* to permit of the required movement of the pins 20ᶜ connecting the ends of the levers 20ᵃ.

I am aware that it has heretofore been proposed to use collapsible signaling apparatus, but these have been of construction which have lacked the necessary requirements for practical use, viz: quickness of action, that is to say, the power of being quickly and easily opened and closed by a small movement only of the operating mechanism; and the attribute of presenting the appearance of an opaque object while in reality being so open as to permit of wind blowing freely therethrough, so as to admit of the apparatus being efficiently used in a high wind. These requirements are fully met in signaling apparatus constructed according to the present invention.

What I claim is—

1. Signaling apparatus for naval and other purposes comprising a skeleton or frame capable of being expanded and collapsed and adapted when expanded to present the appearance of a more or less opaque easily distinguishable body through which wind can readily pass, a mast or post on which said frame or skeleton structure is mounted, and mechanism whereby said skeleton or frame can be quickly expanded and collapsed substantially as herein described.

2. Signaling apparatus for naval and other purposes comprising a skeleton or frame capable of being expanded and collapsed and provided with covering material adapted to impart a more or less opaque, easily distinguishable appearance to said frame, when expanded, while admitting of free passage of air therethrough, a support for said frame, wings or plates fixed to said support and projecting outwardly therefrom, and means whereby said frame can be quickly expanded and collapsed substantially as herein described for the purpose specified.

3. Signaling apparatus for naval and other purposes comprising a number of hinged rods capable of being opened out and closed up, flexible covering material carried by said rods and adapted to impart an easily distinguishable appearance to said apparatus when said rods are opened out and to permit wind to pass freely through said expanded apparatus, a mast or post on which said rods are mounted and from which they extend outwardly from various points around said mast or post when expanded, and means for quickly moving said rods into the open and closed positions, substantially as herein described for the purpose specified.

4. Signaling apparatus for naval and other purposes comprising a number of hinged rods capable of being opened out and closed up, opaque covering material applied separately to each of said rods and extending toward a common center in or parallel to the planes in which the said rods work, a mast or post on which said rods are mounted and from various points around which they project outwardly when expanded, and means for quickly moving said rods into the open and closed positions, substantially as herein described for the purpose specified.

5. Signaling apparatus for naval and other purposes comprising a number of hinged rods capable of being opened out and closed up, flexible covering material applied to said rods so as to impart an opaque easily distinguishable appearance to them when opened out and so as to permit of wind passing freely between them, a mast or post on which said rods are mounted and from which they extend outwardly from various points around said mast or post when expanded wings or plates fixed to said post and extending outwardly therefrom, and means for quickly moving said rods into the open and closed positions substantially as herein described for the purposes specified.

6. Signaling apparatus for naval and other purposes comprising a number of flat opaque easily distinguishable planes hinged or jointed radially to rings or tubes, and between which wind can freely pass, a post whereon said rings or tubes are mounted, and means for quickly moving said rings or tubes relatively to each other, substantially as herein described for the purpose specified.

7. Signaling apparatus for naval and other purposes comprising a number of rods 1 1ᵃ hinged or jointed together in pairs, a support, tubes mounted on said support and to which said pairs of rods are jointed, covering material applied to said rods so that when opened out they will present the appearance of an opaque easily distinguishable body through which wind can readily pass, and lever mechanism for causing rapid relative movement of said tubes toward and from each other, substantially as herein described for the purpose specified.

8. Signaling apparatus for naval and other purposes, comprising a number of rods hinged or jointed together in pairs, a support, tubes mounted on said support and to which said pairs of rods are jointed, covering material applied to said rods so as to impart an opaque appearance thereto while permitting of free passage of air between said rods, guides for the jointed ends of said rods, and means for causing rapid relative movement of said tubes toward and from each other, substantially as herein described for the purpose specified.

9. Signaling apparatus for naval and other purposes, comprising a number of rods 1, 1ᵃ arranged in two series and jointed together in pairs, a hollow mast, tubes mounted therein and to which the other ends of said rods are jointed, guide rods for the jointed ends of said rods, anti-friction rollers carried by said rods and arranged to roll against said guide rods, flexible covering material applied to said rods, wings or plates fixed to said mast between said pairs of rods, a lever journaled in said mast, rods connecting the ends of said lever to said tubes and mechanism located within said hollow mast for operating said lever, substantially as herein described for the purpose specified.

In testimony whereof I have signed my name to this specification in the presence of two subscribing witnesses.

LIONEL DE LAUTOUR WELLS.

Witnesses:
WILLIAM SUTHERLAND WELLS,
   *Netherleigh, Cheltenham.*
GEORGE FREDERICK LODDER,
   *Essex Place, Cheltenham.*